United States Patent [19]
Arakawa et al.

[11] Patent Number: 5,394,558
[45] Date of Patent: Feb. 28, 1995

[54] DATA PROCESSOR HAVING AN EXECUTION UNIT CONTROLLED BY AN INSTRUCTION DECODER AND A MICROPROGRAM ROM

[75] Inventors: Fumio Arakawa, Tokyo; Susumu Narita, Kokubunji; Kunio Uchiyama, Kodaira, all of Japan

[73] Assignee: Hitachi, Ltd., Tokyo, Japan

[21] Appl. No.: 266,900

[22] Filed: Jul. 1, 1994

Related U.S. Application Data

[63] Continuation of Ser. No. 17,498, Feb. 12, 1993, abandoned.

[30] Foreign Application Priority Data

Feb. 20, 1992 [JP] Japan .................. 4-033156

[51] Int. Cl.⁶ .................................. G06F 9/30
[52] U.S. Cl. .................. 395/800; 395/375; 364/231.8; 364/DIG. 1
[58] Field of Search .................. 395/800, 375

[56] References Cited

U.S. PATENT DOCUMENTS

| | | | |
|---|---|---|---|
| 4,519,033 | 5/1985 | Vaughn et al. | 395/550 |
| 4,574,344 | 3/1986 | Harris et al. | 395/500 |
| 4,658,355 | 4/1987 | Hatakeyama et al. | 395/800 |
| 4,812,972 | 3/1989 | Chastain et al. | 395/375 |
| 5,202,967 | 4/1993 | Matsuzaki et al. | 395/375 |
| 5,247,624 | 9/1993 | Koumoto et al. | 395/375 |

OTHER PUBLICATIONS

Byte, Nov. 1989, vol. 14, No. 12, pp. 323-329.

*Primary Examiner*—Alyssa H. Bowler
*Assistant Examiner*—John Harrity
*Attorney, Agent, or Firm*—Antonelli, Terry Stout & Kraus

[57] ABSTRACT

A data processor in which, when two primitive instructions are decoded by instruction decoders, a microprogram ROM is not used under the control of a selector, and the two primitive instructions are executed in parallel by instruction execution units in accordance with the decoded outputs of the instruction decoders. When a high performance instruction is decoded by one of the instruction decoders, at a first step processing, one of the instruction execution units selects the output of the one instruction decoder to execute the instruction. At a second step processing, the one instruction execution unit selects a microinstruction of the microprogram ROM and executes the instruction. It is therefore unnecessary to use the microprogram ROM for the execution of a primitive instruction and a high performance instruction at the first step processing, thereby reducing the capacity, area and power consumption of the microprogram ROM.

2 Claims, 6 Drawing Sheets

I: INSTRUCTION FETCH STAGE
D: DECODE STAGE
E: EXECUTION STAGE
A: MEMORY ACCESS STAGE
S: REGISTER STORE STAGE

PF: PREFETCH STAGE
D1: 1ST DECODE STAGE
D2: 2ND DECODE STAGE
EX: EXECUTION STAGE
WB: WRITE BACK STAGE

PF: PREFETCH STAGE
ID: DECODE STAGE
EX: EXECUTION STAGE

PF: PREFETCH STAGE
ID: DECODE STAGE
EX: EXECUTION STAGE
RR: ROM READ STAGE

DATA PROCESSOR HAVING AN EXECUTION UNIT CONTROLLED BY AN INSTRUCTION DECODER AND A MICROPROGRAM ROM

This application is a continuation application of Ser. No. 08/017,498, filed Feb. 12, 1993, now abandoned.

BACKGROUND OF THE INVENTION

1. Field of the Invention

The present invention relates to a data processor such as a microprocessor, and more particularly a system for a data processor processing an instruction set containing a primitive instruction and a high performance instruction, capable of parallel execution of a plurality of primitive instructions and execution of both primitive instructions and high performance instructions at high speed, A primitive instruction is an instruction which can be processed using an instruction execution unit one time, and a high performance instruction is an instruction which requires use of an instruction execution unit two or more times.

2. Description of the Related Art

Examples of conventional microprocessors capable of processing an instruction set containing both primitive instructions and high performance instructions, are such as 80486 described in "BYTE, November 1989, VOL.14/No.12, pp. 323–329" and i960CA described in "NIKKEI ELECTRONICS, 1990.1.8 (No. 440), pp. 177–186.

As shown in FIG. 7, 80486 microprocessor is constructed of an instruction fetch unit 10, instruction decoder 20, microprogram ROM 30, address calculation unit 120, and instruction execution unit 50. In operation, an instruction code 60 contained in an instruction to be decoded is sent from the instruction fetch unit 10 to the instruction decoder 20. A subsequent instruction code position indication signal 70 for indicating the position of the next instruction code to be decoded is sent from the instruction decoder 20 to the instruction fetch unit 10. A ROM address 100 which is part of the decoded result of the instruction is sent from the instruction decoder 20 to the microprogram ROM 30. An instruction execution unit control signal 130 is sent from the microprogram ROM 30 to the instruction execution unit 50. An address calculation unit control signal 130 which is another part of the decoded result of the instruction is sent from the instruction decoder 20 to the address calculation unit 120, and a memory access address 140 is sent from the address calculation unit 120 to the instruction execution unit 50.

As shown in FIG. 4, 80486 microprocessor has five pipeline stages including a prefetch stage PF, first decode stage D1, second decode stage D2, execution stage EX, and write-back stage WB.

At the prefetch stage PF, the instruction fetch unit 10 fetches an instruction from a main memory or cache (not shown), and stores it in a prefetch queue of the instruction fetch unit 10. The instruction fetch unit 10 also supplies the next instruction code 60 to be decoded to the instruction decoder 20 in accordance with the subsequent instruction code position indication signal 70 from the instruction decoder 20.

At the first decode stage D1, the instruction code 60 supplied from the instruction fetch unit 10 to the instruction decoder 20 is decoded to generate the ROM address 100 and address calculation unit control signal 130 as the instruction-decoded results.

At the second decode stage D2, the instruction execution unit control signal 110 is read from the microprogram ROM 30 at the ROM address 100 supplied from the instruction decoder 20, and the address calculation unit 120 calculates the memory access address 140 in accordance with the address calculation unit control signal 130.

At the execution stage EX, an arithmetic logic unit (ALU) (not shown) of the instruction execution unit 50 performs an arithmetic logic operation in accordance with the instruction execution unit control signal 110, or a memory access circuit of the instruction execution unit 50 accesses the memory at the memory access address 140. The instruction execution unit 50 performs other operations. This memory access is immediately executed using the memory access address 140 supplied from the address calculation unit 120.

At the write-back stage WB, the operation result or memory fetch data at the execution stage EX is stored in a register file (not shown).

As seen from the above description, in 80486 microprocessor, control signals are always obtained as outputs from the microprogram ROM 30, except a control signal for address calculation.

In i960CA, only high performance instructions are executed in response to a control signal output from a microprogram ROM. Namely, a high performance instruction is divided into primitive instructions and stored in the microprogram ROM. Therefore, a high performance instruction is executed in response not to an instruction code but to an output from the microprogram ROM. Specifically, as shown in FIG. 8, i960CA microprocessor is constructed of an instruction fetch unit 10, instruction decoder 20, microprogram ROM 30, instruction decoder input selector 150, and instruction execution unit 50. An instruction code 60 is sent from the instruction fetch unit 10 to the instruction decoder input selector 150. A ROM output 90 is sent from the microprogram ROM 30 to the instruction decoder input selector 150. An instruction decoder input 160 is sent from the instruction decoder input selector 150 to the instruction decoder 20. A subsequent instruction code position indication signal 70 is sent from the instruction decoder 20 to the instruction fetch unit 10. A ROM address 100 is sent from the instruction decoder 20 to the microprogram ROM 30. An instruction decoder input select signal 170 is sent from the instruction decoder 20 to the instruction decoder input selector 150. An instruction execution unit control signal 110 is sent from the instruction decoder 20 to the instruction execution unit 50.

As shown in FIG. 5, microprocessor i960CA has three pipeline stages including a prefetch stage PF, decode stage ID, and execution stage EX.

At the prefetch stage PF, while executing a primitive instruction, the instruction fetch unit 10 fetches the instruction code 60 and stores it in a prefetch queue, and the instruction code 60 is supplied via the instruction decoder input selector 150 to the instruction decoder 20 in accordance with the subsequent instruction code position indication signal 70 from the instruction decoder 20. On the other hand, while executing a high performance instruction, the ROM output 90 is read from the microprogram ROM 30 and supplied via the instruction decoder input selector 150 to the instruction decoder 20.

At the decode stage ID, the instruction decoder 20 decodes the instruction code 60 from the instruction fetch unit 10 or the ROM output 90 from the microprogram ROM 30, to generate an instruction execution unit control signal 110, and if the decoded instruction is a high performance instruction, it generates a ROM address 100 and changes an instruction decoder input select signal 170 to the ROM output select side.

At the execution stage EX, the instruction execution unit 50 performs an arithmetic logic operation, memory access, or other operations.

As described above, in 80484 microprocessor, control signals other than for address calculation are obtained as ROM outputs for all instructions. With such a microprocessor, all instructions require microprograms, resulting in an increase of ROM capacity, and a corresponding increase of ROM area and power consumption, posing a problem of a slow operation speed.

Furthermore, since the microprogram ROM is continuously enabled, the power consumption by ROM occupies a larger portion of the total power consumption of the microprocessor. The higher the integration degree and operation frequency of a microprocessor, the more the power is consumed by the microprocessor. It is therefore necessary to suppress an increase in power consumption, and accordingly to suppress the power consumption by ROM.

Still further, in the case of the parallel execution of a plurality of instructions, e.g., two instructions, the structure of microprocessors becomes as shown in FIG. 2. With the arrangement shown in FIG. 2, each of the two instructions requires not only its own instruction decoder but also its own ROM. Two ROMs are therefore necessary for the parallel execution of two instructions. Another problem is that executing two high performance instructions using two instruction execution units requires control using two independent ROMs.

Namely, in FIG. 2, first and second ROM addresses 101 and 102, first and second address calculation unit control signals 131 and 132, and first and second memory access signals 141 and 142 are duplicated.

As also described above, i960CA microprocessor executes a primitive instruction without using ROM, and executes a high performance instruction by using ROM. As shown in FIG. 9, an overhead of reading ROM appears at the execution start of a high performance instruction, causing one cycle vacancy of the pipeline. For example, considering a high performance instruction requiring two or three cycles to complete its execution, the performance degradation by this vacancy of the pipeline cannot be neglected.

Furthermore, in the case of the parallel execution of a plurality of instructions, if for example a high performance instruction and the subsequent instruction are supplied to decoders at the same time, a prefetch stage for the instruction subsequent to the high performance instruction is required to be newly executed. It is therefore necessary for the instruction decoder to change the subsequent instruction code position indication signal to be output to the instruction fetch unit, depending upon whether the decoded instruction is a high performance instruction or a primitive instruction. With such a system, a processor requiring a full instruction code for the discrimination between the high performance instruction and primitive instruction takes time for generating the subsequent instruction code position indication signal. As a result, the cycle time for supplying an instruction code to the instruction decoder becomes long, resulting in a performance degradation.

SUMMARY OF THE INVENTION

It is therefore an object of the present invention to provide a data processor capable of efficiently executing both a primitive instruction using an instruction execution unit one time and a high performance instruction required to use the instruction execution unit two or more times, and also capable of reducing the capacity of a microprogram ROM.

In order to achieve the above object, a data processor typical to the present invention generates an instruction execution unit control signal by selecting either an output of the instruction decoder or an output of a microprogram ROM. Specifically, an instruction execution unit control signal can be generated by selecting an output of the instruction decoder in one case, and in another case, part of or all instruction execution unit control signals can be generated by selecting an output of the microprogram ROM and the remaining control signals can be generated by selecting an output of the instruction decoder.

A data processor capable of parallel execution of a plurality of instructions has a corresponding plurality of instruction decoders and instruction execution units. A single microprogram ROM outputs a signal for controlling a plurality of instruction execution units. Instruction execution unit control signals are generated by selecting outputs of the plurality of instruction decoders and one microprogram ROM. Namely, instruction execution unit control signals can be generated from outputs of the instruction decoders in one case, and in another case, part of or all instruction execution unit control signals are generated from an output of the microprogram ROM and the remaining control signals are generated from outputs of the instruction decoders.

A primitive instruction executable by using the instruction execution unit one time is executed by controlling the instruction execution unit in response to the instruction execution unit control signal generated only from the instruction decoder output. A high performance instruction required to be executed by using the instruction execution unit two or more times, is executed by controlling the instruction execution unit in response to the instruction execution unit control signal generated only from the instruction decoder output at the first step processing, and at the second and subsequent processing by controlling the instruction execution unit in response to part of or all control signals generated from a microprogram ROM output and in response to the remaining control signals generated from the instruction decoder output. Accordingly, it is not necessary to use ROM for the execution of a primitive instruction, reducing the capacity of ROM by the amount corresponding to the number of primitive instructions, and correspondingly reducing the area and power consumption of ROM and thus improving the operation speed. In addition, since ROM is not enabled when executing a primitive instruction which has a high appearing probability in a program, the average power consumption of the processor can be reduced.

Furthermore, it is possible to achieve parallel execution of a plurality of primitive instructions by using a single ROM, and to allow high speed execution for the second and subsequent step processing of a high performance instruction by using all of the instruction execution unit.

The other objects and advantages of the present invention will become apparent from the following de-

DESCRIPTION OF THE PREFERRED EMBODIMENTS

Embodiments of the present invention will be described in detail with reference to the accompanying drawings.

Structure of Microprocessor of Fundamental Embodiment

Figure 6:
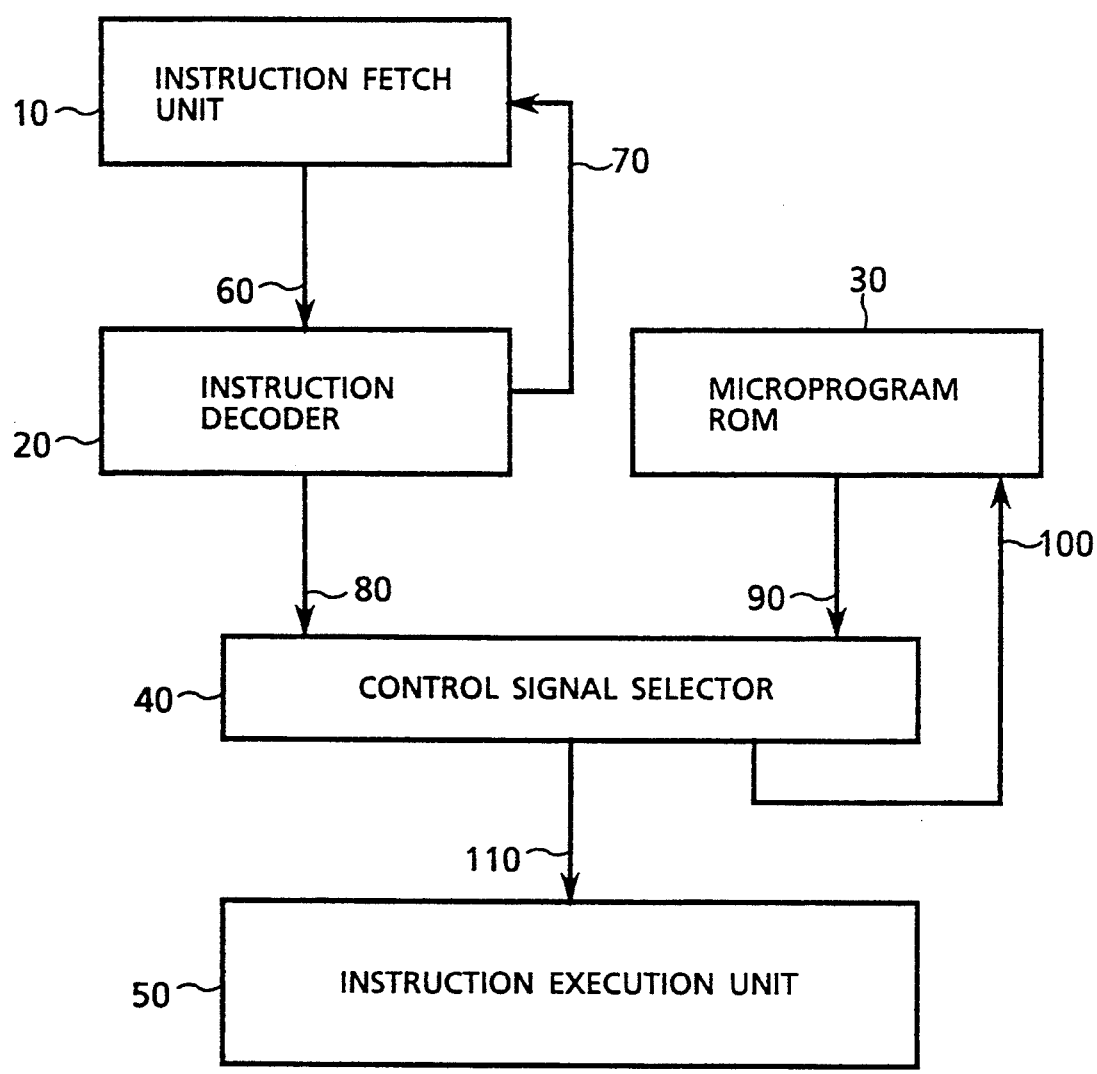
FIG. 6 is a block diagram showing the structure of a microprocessor according to a fundamental embodiment of the present invention.
Figure 7:
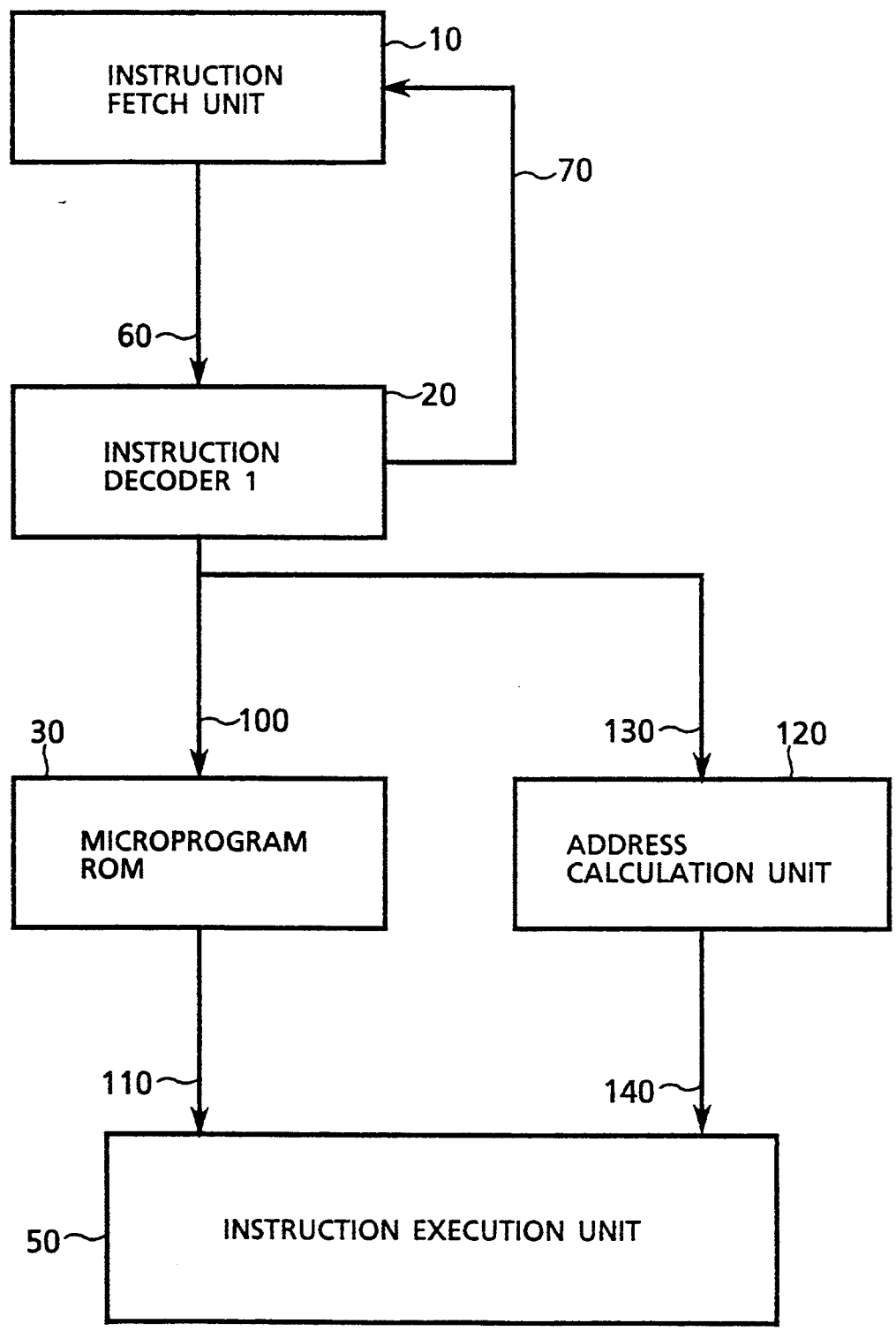
FIG. 7 is a block diagram showing the structure of another conventional microprocessor.
Figure 8:
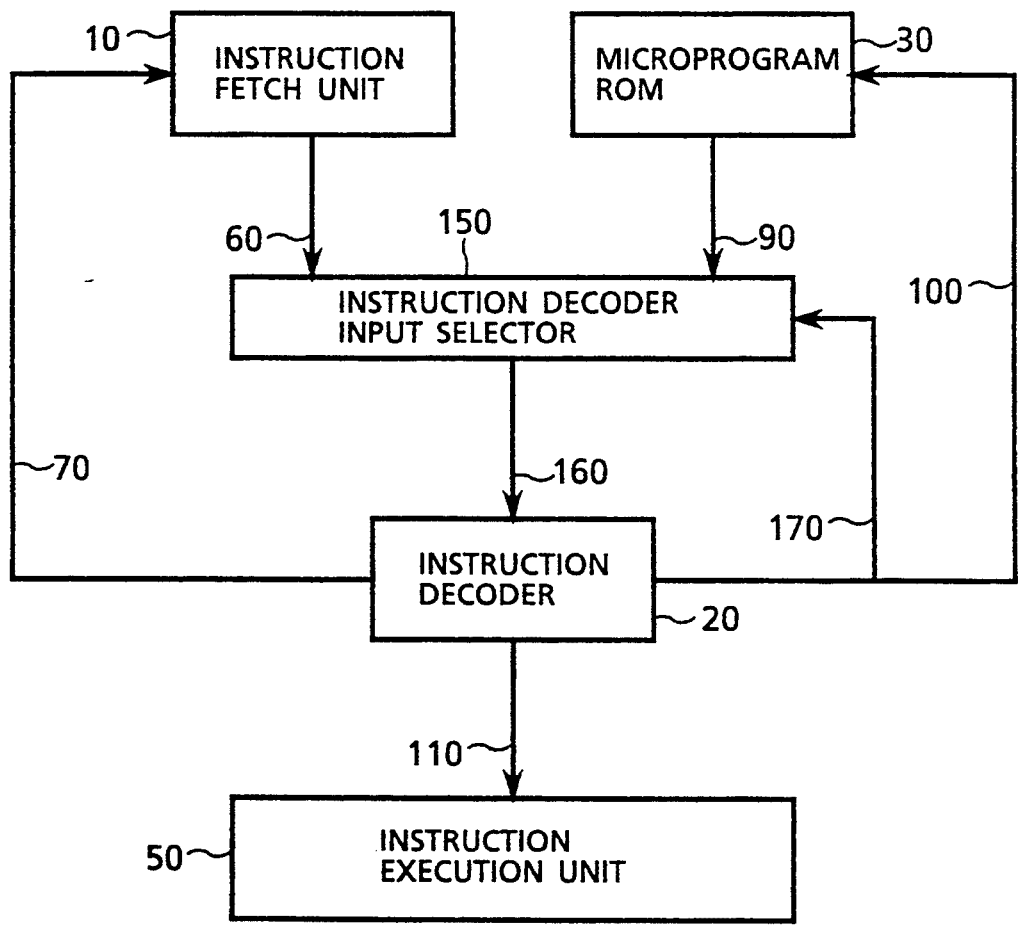
FIG. 8 is a block diagram showing the structure of yet another conventional microprocessor.
Figure 9:
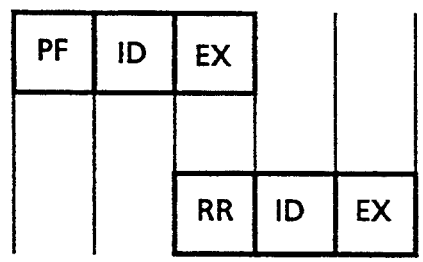
FIG. 9 is a diagram illustrating the pipeline operation when executing a high performance instruction using the conventional microprocessor shown in FIG. 8.

FIG. 6 shows the structure of a microprocessor according to a fundamental embodiment of the present invention. The microprocessor is constructed of an instruction fetch unit 10, instruction decoder 20, microprogram ROM 30, control signal selector 40, and instruction execution unit 50.

Fundamental Operation

The instruction fetch unit 10 fetches an instruction from a main memory or cache memory (not shown), and an instruction code 60 is sent from the instruction fetch unit 10 to the instruction decoder 20. The instruction fetch unit 10 supplies the next instruction code 60 to be decoded to the instruction decoder 20 in accordance with a subsequent instruction code position indication signal 70 from the instruction decoder 20. An instruction decoder output 80 which is the decoded result of the instruction decoder 20, is sent to the control signal selector 40, and a microprogram ROM output 90 from the microprogram ROM 30 is sent to the control signal selector 40. A ROM address 100 from the control signal selector 40 is sent to the microprogram ROM 30, and an instruction execution unit control signal 110 from the control signal selector 40 is sent to the instruction execution unit 50.

Pipeline

Figure 3:
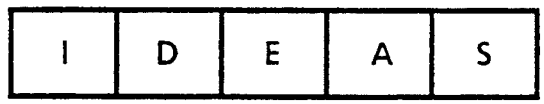
FIG. 3 is a diagram illustrating the pipeline operation of a microprocessor according to an embodiment of the present invention.
Figure 4:
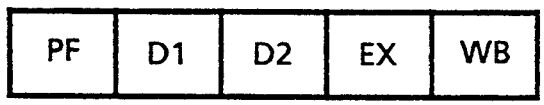
FIG. 4 is a diagram illustrating the pipeline operation of the conventional microprocessor shown in FIG. 2.
Figure 5:
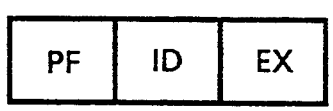
FIG. 5 is a diagram illustrating the pipeline operation of the conventional microprocessor shown in FIG. 8.

As shown in FIG. 3, the microprocessor of this embodiment shown in FIG. 6 has five pipeline stages including an instruction fetch stage I, instruction decode stage D, execution stage E, memory access stage A, and register store stage S.

At the instruction stage I, the instruction fetch unit 10 operates. At the instruction decode stage D, the instruction decoder 20, microprogram ROM 30, and control signal selector 40 can generate the instruction execution unit control signal 110. At each of the execution stage E, memory access stage A, and register store stage S, the instruction execution unit 50 executes an operation, a memory access or register store. A primitive instruction executable by using the instruction execution unit 50 one time is executed by operating each stage of the five pipeline stages one time. On the other hand, a high performance instruction, executed by using the instruction execution unit 50 two or more times, executes each stage two or more times.

The detailed description of a pipeline operation when executing a primitive instruction will be given first.

At the instruction fetch stage I, the instruction fetch unit 10 fetches an instruction from a main memory or cache memory and stores it in the internal prefetch queue. At the same time, the instruction fetch unit 10 supplies the instruction code to be next decoded to the instruction decoder 20 in accordance with the subsequent instruction code position indication signal 70. In this manner, the instruction fetch unit 10 fetches the instruction code and holds it in its prefetch queue, in parallel with supplying the instruction code 60 to the instruction decoder 20 in accordance with the subsequent instruction code position indication signal 70. In the first half of the instruction decode stage for the previous instruction executed by the instruction decoder 20 at the same time as execution of the instruction fetch stage, the subsequent instruction code position indication signal 70 is generated and supplied to the instruction fetch unit 10. Therefore, selecting the instruction code 60 from the prefetch queue is performed in the second half of the instruction fetch stage I.

At the instruction decode stage D, the instruction decoder 20 decodes the instruction code 60 in the first half of this stage to judge the instruction length and generate the subsequent instruction code position indication signal 70. The instruction decoder 20 generates an instruction decoder output 80 and supplies it to the control signal selector 40. The control signal selector 40 selects the instruction decoder output 80 as a ROM address 100 and instruction execution unit control signal 110, and supplies them to the microprogram ROM 30 and instruction execution unit 50, respectively. However, in the case of executing a primitive instruction, the ROM address 100 supplied to the microprogram ROM 30 does not activate the microprogram ROM 30, and so a microprogram ROM output 90 will not be generated.

At the execution stage E, in accordance with the instruction execution unit control signal 110 which is the instruction decoder output 80, the instruction execution unit 90 performs an address calculation, arithmetic logic operation, branch condition discrimination, or the like. Of the instruction execution unit control signal 110, the control information of the memory access and register store is held by the instruction execution unit 50 during one cycle.

At the memory access stage A, in accordance with the memory access control information held during the execution stage E, the instruction execution unit 50 performs a data fetch, data store, or data holding. An address for the data fetch or data store is calculated at the execution stage E. The data holding means obtained at the execution stage is held for the next register store stage S, for executing an instruction not required to access the memory, such as a register-to-register operation instruction. The register store control information held during the execution stage E is held for another one cycle.

At the register store stage S, in accordance with the register store control information held during the memory access stage A, the instruction execution unit 50 stores in a register the data fetched or held during the memory access stage A.

Pipeline Executing High Performance Instruction

The detailed description of a pipeline operation when executing a high performance instruction will be given next.

As already described, it is necessary for the execution of a high performance instruction to use the instruction execution unit 50 two or more times. The first step processing for executing a high performance instruction at each of the instruction fetch stage I, decode stage D, execution stage E, memory access stage A, and register store stage S, is the same as that of a primitive instruction. Therefore, the microprogram ROM 30 and its output 90 are not used.

The second and subsequent processing at each of the execution stage E, memory access stage A, and register store stage S is also the same as that of a primitive instruction.

At the instruction fetch stage I of the second and subsequent processing, the instruction decoder 20 supplies the subsequent instruction code position indication signal 70 held to the instruction subsequent to the high performance instruction now under execution, so that the instruction fetch unit 10 can continuously output the instruction codes 60 of the subsequent instruction. If the instruction prefetch queue has a vacant area, the instruction fetch is so as not to leave the vacant area.

At the instruction decode stage D of the second and subsequent step processing, the microprogram ROM 30 is activated or enabled, whereas the operation of the instruction decoder 20 is stopped. As the instruction decoder output 80, the decoded result held at the first step is continuously output.

The ROM address 100 selected by the control signal selector 40 one step before for the disabled microprogram ROM 30 is used as the search address for the microprogram ROM 30. Specifically, the output 90 of the microprogram ROM 30 disabled at the first step does not contain a microinstruction for controlling the instruction execution unit 50 at the first step, but it contains a subsequent microinstruction address indicating the location of a microinstruction for controlling the instruction execution unit 50 at the second and subsequent step processing. Using the subsequent microinstruction address as the search address 100 of the microprogram ROM 30, a microinstruction for controlling the instruction execution unit 50 can be read from the microprogram ROM 30 from its output 90.

The control signal selector 40 selects the microprogram ROM output 90 as the ROM address 100 and instruction execution unit control signal 110, and supplies them to the microprogram ROM 30 and instruction execution unit 50. Of the instruction execution unit control signal 110, information of a register number, e.g. operand size and the like which can be set arbitrarily by an instruction, is made selectable by using the instruction decoder output 80. The reason for this is that if the microprogram ROM output 90 is to be used for such information arbitrarily selectable by an instruction, a different microprogram is required for each different value of such information, resulting in an increased capacity of the microprogram ROM 30. For the purpose of such operation, the instruction decoder output 80 continuously output starting from the first step is used. An instruction set of a particular kind uses information arbitrarily settable by an instruction not at the first step but at the second and subsequent steps. For a microprocessor applicable to such an instruction set, information arbitrarily settable by an instruction and usable at the second and subsequent steps are output as the instruction decoder output 80 to allow the second and subsequent steps to use this information.

The control by the control signal selector 40 for selecting one of the instruction decoder output 80 and microprogram ROM output 90 is carried out in the following manner. Namely, a final step indication signal is made to be contained in the instruction decoder output 80 and microprogram ROM output 90, and this final step indication signal is output from the instruction decoder output 80 in the case of a primitive instruction, and from the microprogram ROM output 90 in the case of a high performance instruction.

When the final step indication signal is asserted by the output selected by the control signal selector 40, the instruction decoder 20 is operated at the decode stage D for the subsequent instruction, and the control signal selector 40 selects the decoded result output 80 as the ROM address 100 and instruction execution unit control signal 110. If the final step indication signal is not asserted, the control signal selector 40 selects the microprogram ROM output 90. The same conditions as above are used for selecting the final step indication signal.

With the system arrangement described above, it becomes possible not to use the microprogram ROM 30 when executing a primitive instruction, reducing the capacity of the microprogram ROM 30 for primitive instructions, reducing the area and power consumption of the microprogram ROM 30, and improving the operation speed. Furthermore, only one of the instruction decoder 20 and microprogram ROM 30 operates at any time during the processing, further reducing the power consumption.

Particular Embodiment

Figure 1:
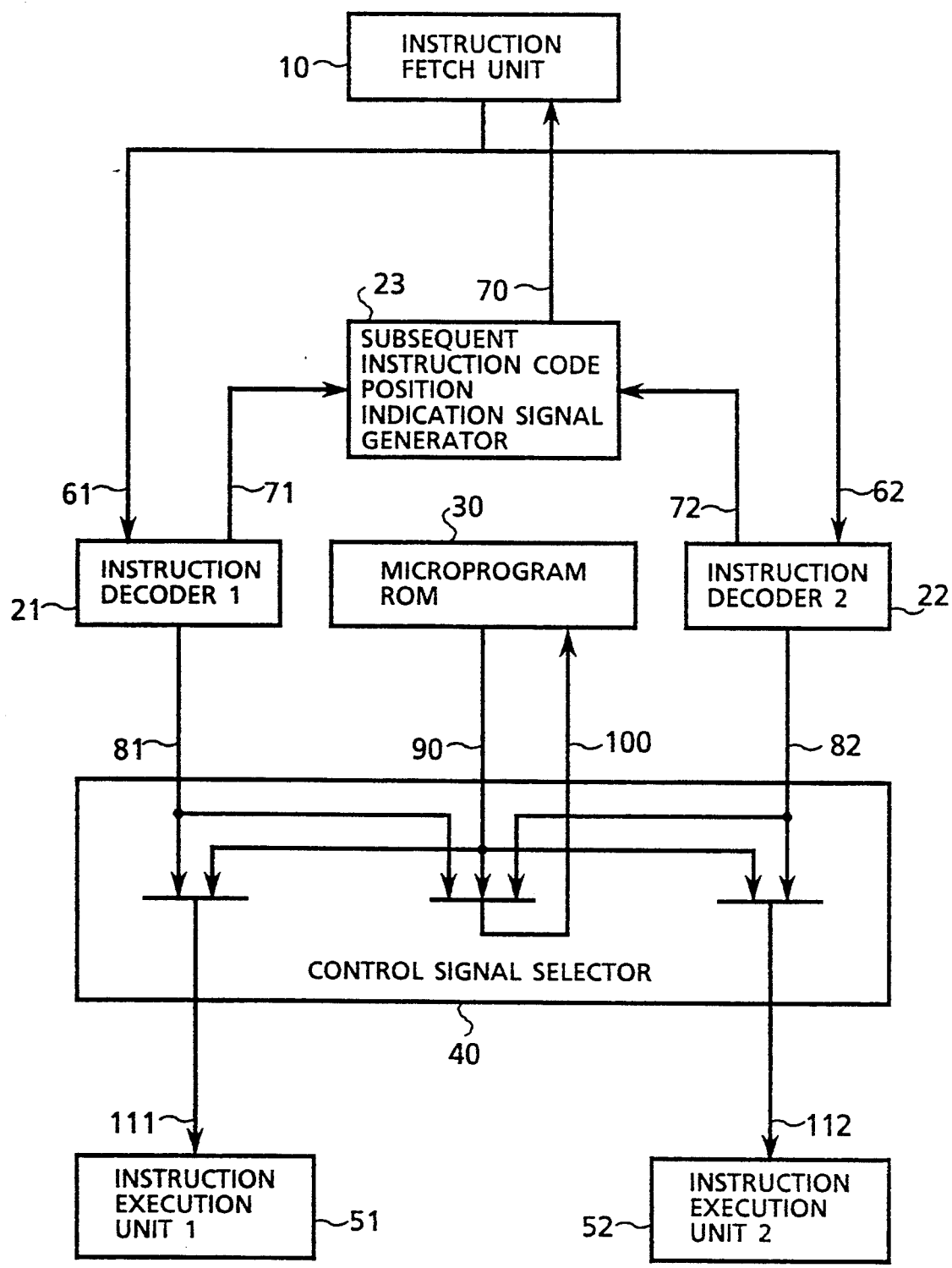
FIG. 1 is a block diagram showing the structure of a microprocessor capable of parallel executing two instructions according to a particular embodiment of the present invention.
Figure 2:
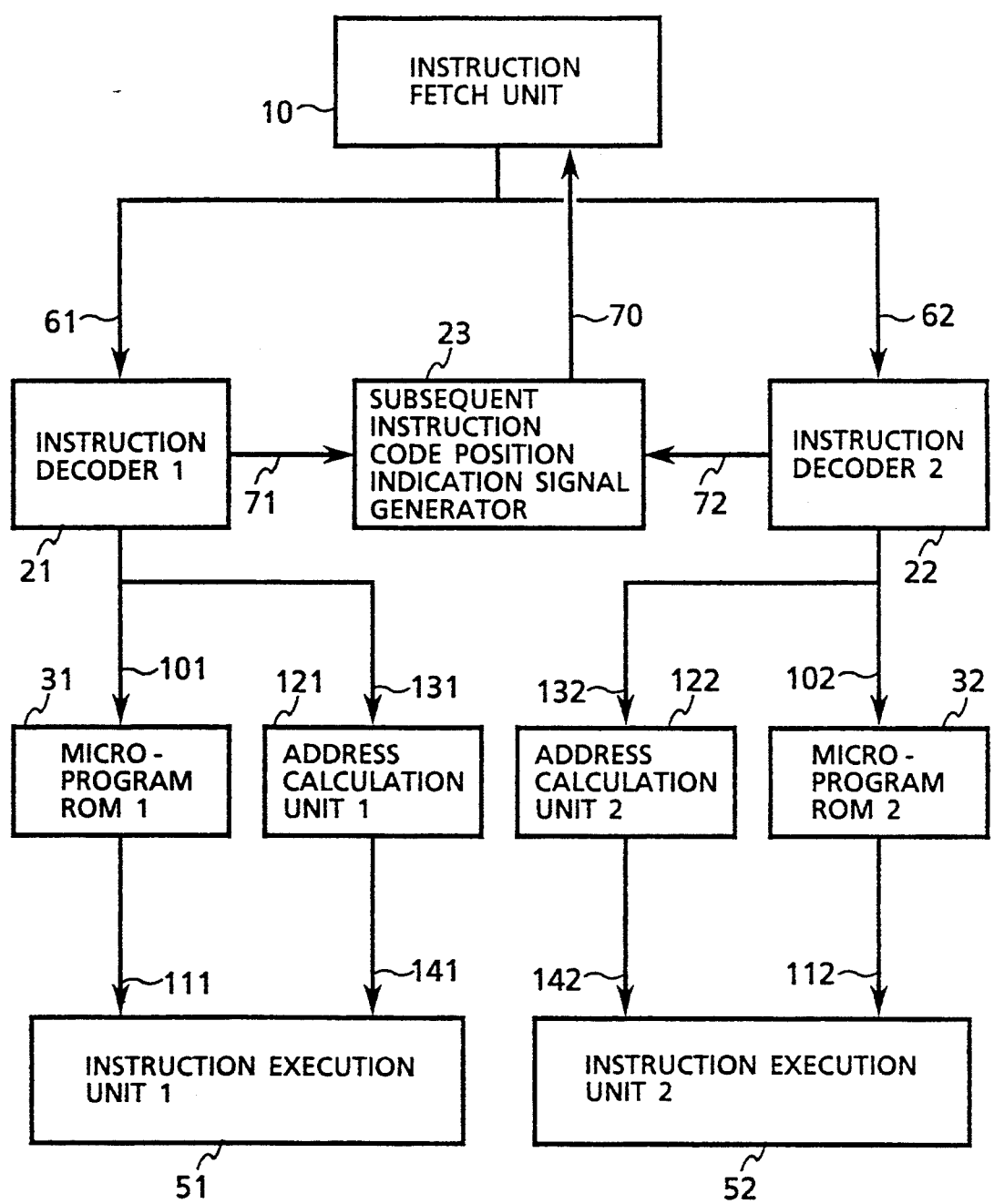
FIG. 2 is a block diagram showing the conventional structure of a microprocessor capable of parallel execution of two instructions.

FIG. 1 shows the structure of a microprocessor according to a-particular embodiment of the present invention, which processor can execute a plurality of instructions in parallel. The microprocessor is constructed of an instruction fetch unit 10, first instruction decoder 21, second instruction decoder 22, subsequent instruction code position indication signal generator 23, microprogram ROM 30, control signal selector 40, and first and second instruction execution units 51 and 52.

Fundamental Operation

First and second instruction codes 61 and 62 are supplied in parallel from the instruction fetch unit 10 to the first and second instruction decoders 21 and 22. The first and second instruction decoders 21 and 22 decode the first and second instruction codes 61 and 62, respectively, and determine first and second instruction lengths 71 and 72 which are sent to the subsequent instruction code position indication signal generator 23. In response, the generator 23 supplies a subsequent instruction code position indication signal 70 to the instruction fetch unit 10. The first and second instruction decoders 21 and 22 supply first and second instruction decoder outputs 81 and 82 to the control signal selector 40. The microprogram ROM 30 supplies a microprogram ROM output 90 to the control signal selector 40. A ROM address 100 is supplied from the control signal selector 40 to the microprogram ROM 30, and first and second instruction execution unit control signals 111 and 112 are supplied to the first and second instruction execution units 51 and 52, respectively.

Pipeline

As shown in FIG. 3, the microprocessor of this embodiment shown in FIG. 1 has five pipeline stages including an instruction fetch stage I, instruction decode stage D, execution stage E, memory access stage A, and register store stage S.

At the instruction stage I, the instruction fetch unit 10 operates. At the instruction decode stage D, the first and second instruction decoders 21 and 22, subsequent instruction code position indication signal generator 23, microprogram ROM 30, and control signal selector 40 can generate the first and second instruction execution unit control signals 111 and 112. At each of the execution stage E, memory access stage A, and register store stage S, the first and second instruction execution units 51 and 52 execute an operation, a memory access or register store.

Outline of Execution of Primitive and High Performance Instructions

A primitive instruction executable by using the first or second instruction execution unit 51 or 52 one time, is executed by operating each stage of the five pipeline stages one time. On the other hand, an instruction other than the primitive instruction, i.e., a high performance instruction, is executed by operating each stage two or more times.

Execution of Primitive Instruction

The detailed description of a pipeline operation when parallel executing two primitive instructions will be given first.

At the instruction fetch stage I, the instruction fetch unit 10 parallel supplies the first and second instruction codes 61 and 62 to the first and second instruction decoders 21 and 22. The instruction fetch unit 10 has a prefetch queue in which an instruction code is fetched and held in advance so that in accordance with the subsequent instruction code position indication signal 70, the first instruction code 61 is supplied to the first instruction decoder 21, and the subsequent code to the first instruction code 61 is supplied as the second instruction code 62 to the second instruction decoder 22. The "subsequent code" used herein is an instruction code subsequent to the first instruction code 61 if the first instruction code 61 has a minimal instruction length. If the first instruction code 61 is not of a minimal instruction length, the second instruction code 62 is an expansion portion of the first instruction code 61. The subsequent instruction code position indication signal 70 is generated at the first half of the instruction decode stage of the previous instruction executed simultaneously with the instruction fetch stage of the current instruction, and supplied to the instruction fetch unit 10. Therefore, selection of the first and second instruction codes 61 and 62 from the prefetch queues is performed in the second half of the instruction prefetch stage.

At the instruction decode stage D, the first and second instruction decoders 21 and 22 decode the first and second instruction codes 61 and 62 at the first half of this stage, and supply the first and second instruction lengths 71 and 72 to the subsequent instruction code position indication signal generator 23. In accordance with the first and second instruction lengths 71 and 72, the subsequent instruction code position indication signal generator 23 generates the subsequent instruction code position indication signal 70. The first and second instruction decoders 21 and 22 generate first and second instruction decoder outputs 81 and 82, and supply them to the control signal selector 40. After the two primitive instructions are decoded in parallel by the first and second instruction decoders 21 and 22, the control signal selector 40 selects, as a ROM address 100, one of the first and second decoder outputs 81 and 82 and supplies it to the microprogram ROM 30, and also selects, as the first and second instruction execution unit control signals 111 and 112, the first and second instruction decoder outputs 81 and 82. In this case, the supplied ROM address 100 disables the microprogram ROM 30.

If the first instruction length 71 is not the minimal instruction length, the second instruction code 62 is the expansion portion of the first instruction code, and not the real instruction code. As a result, the second instruction length 72 and second instruction decoder output 82 generated by the second instruction decoder 22 are meaningless information. For this reason, the subsequent instruction code position indication signal generator 23 generates a correct subsequent instruction code position indication signal 70 based upon the first instruction length 71. Also in this case, the second instruction decoder 22 is disabled so as to avoid erroneous operation of the microprocessor caused by meaningless information. On the other hand, if the first instruction length 71 is the minimal instruction length, the second instruction code 62 is an instruction code, and so the second instruction length 72 and second instruction decoder output 82 are correct. In this case, therefore, the subsequent instruction code position indication signal generator 23 generates the subsequent instruction code position indication signal 70 by using the second instruction length 72, without invalidating the second instruction decoder output 82.

At each stage of the execution stage E, memory access stage A, and register store stage S, in accordance with the first and second instruction execution unit control signals 111 and 112, the first and second instruction execution units 51 and 52 perform operations similar to those performed by the instruction execution unit 50 shown in FIG. 6 in accordance with the instruction execution unit control signal 110.

Following the above-described processing, the first and second instruction execution units 51 and 52 can parallel execute two primitive instructions in parallel by using the first and second instruction decoder outputs 81 and 82, without using the ROM output 90 of the microprogram ROM 30.

Execution of High Performance Instruction

The detailed description of a pipeline operation when executing a high performance instruction will be given next.

The first step processing at each stage for executing a high performance instruction is generally the same as for a primitive instruction. Namely, at the first processing for a high performance instruction, when a high performance instruction is supplied from the instruction fetch unit 10 to one of the first and second instruction decoders 21 and 22 (e.g., decoder 21), the signal selector unit 40 selects an output of the one instruction decoder 21 without selecting a microinstruction of the output 90 of the microprogram ROM 30. In accordance with the output 81 of the one instruction decoder 21, one of the first and second instruction execution units 51 and 52 (in this case, unit 51) executes the first step processing. However, the following point is different from the case of executing a primitive instruction. Namely, if the first instruction code 61 is a high performance instruction and the second instruction code 62 is an instruction code, the second instruction decoder output 82 is invalidated until the process of the first instruction code 61 is completed.

The reason for this is as follows. If the second instruction code 62 is a primitive instruction, the process of the second instruction code 62 is completed before that of the first instruction code 61 is completed unless the second instruction decoder output 82 is invalidated. On the other hand, if the second instruction code 62 is a high performance instruction, the second and subsequent step processing overlaps of the second instruction code 62 with the process of the first instruction code 61 at the microprogram ROM 30. It is therefore impossible for the first and second instruction execution units 51 and 52 to execute two high performance instructions at the same time at the second and subsequent step processing.

At the second step processing for a high performance instruction, the signal selector 40 selects a microprogram of the output 90 of the microprogram ROM 30, so that the one instruction execution unit 51 can execute the second step processing in accordance with the microinstruction obtained from the output of the signal selector 40.

Specifically, at the instruction fetch stage I from the second and subsequent step processing, the subsequent instruction code position indication signal generator 23 holds the subsequent instruction code position indication signal 70 which corresponds to the instruction subsequent to the high performance instruction under execution. Therefore, the instruction fetch unit 10 can continuously output the subsequent instruction code and the further next subsequent instruction code (in the case of the minimal instruction length of the subsequent instruction), as the first and second instruction codes 61 and 62. If there is a vacant area in the instruction prefetch queues, an instruction fetch is carried out so as to not to leave the vacant area.

At the instruction decode stage D of the second and subsequent step processing, the microprogram ROM 30 is activated or enabled, whereas the operations of the first and second instruction decoders 21 and 22 are stopped. As the first and second decoder outputs 81 and 82, the decoded results held at the first step are continuously output. The ROM address 100 selected by the control signal selector 40 one step before in quite the same manner as the embodiment shown in FIG. 6 is used as the search address for the microprogram 60. The control signal selector 40 selects as the ROM address 100 the subsequent microinstruction address of microprogram ROM output 90, and supplies it to the microprogram ROM 30. A microinstruction of the microprogram ROM output 90 is supplied to a selected one of the first and second instruction execution units 51 and 52. Which unit is selected and supplied with a microinstruction depends on which one of the first and second instruction decoders 21 and 22 decoded the high performance instruction. However, like the embodiment shown in FIG. 6, of the first and second instruction execution unit control signals 111 and 112, information arbitrarily settable by an instruction is arranged to be selected from the first or second instruction decoder output 81 or 82. Which of the first and second decoder outputs 81 and 82 is to be selected depends also on which one of the first and second instruction decoders 21 and 22 decoded the high performance instruction.

The control by the control signal selector 40 for selecting one of the first and second instruction decoder outputs 81 and 82 and microprogram ROM output 90, is carried out in the following manner. Namely, a final step indication signal is made to be contained in the first and second instruction decoder outputs 81 and 82 and microprogram ROM output 90, and this final step indication signal is output from the first or second instruction decoder output 81 or 82 in the case of a primitive instruction, and from the microprogram ROM output 90 in the case of a high performance instruction.

An end mode signal is also made to be contained in the microprogram ROM output 90, the end mode signal discriminating whether the final step is to be executed by using only the first instruction execution unit 51 or whether it is to be executed by using both the first and second instruction execution units 51 and 52. This end mode signal can be output as the microprogram ROM output 90 at the final step.

If the second instruction decoder output 82 is not invalidated until the process of the first instruction code 61 of a high performance instruction is completed, and when the final step indication signal is asserted by the output selected by the control signal selector 40 at the previous step, the first and second instruction decoders 21 and 22 are operated at the instruction decode stage before the final process of the first instruction code 61 is completed. During this decode operation, the final process of the first instruction code 61 can be executed by the first instruction execution unit 51, while operating the second instruction execution unit 52 in accordance with the second instruction decoder output 82 decoded in advance of the first instruction code 61.

Specifically, if it is judged, from the decoded results by the first and second instruction decoders 21 and 22 that the first instruction decoder output 81 is valid and the first instruction code is a high performance instruction, the first instruction decoder output 81 is selected as the ROM address and final step indication signal. If the final step indication signal is not asserted, the first and second decoders 21 and 22 are not operated but the microprogram ROM is enabled to select the microprogram ROM output 90 as the ROM address 100, and first and second instruction execution unit control signals 111 and 112.

If the second instruction decoder output 82 is invalidated until the process of the first instruction code 61 is completed, and when the final step indication signal is asserted by the microprogram ROM output 90 and the end mode signal indicates the use of only the first instruction execution unit 51, the microprogram ROM output 90 is selected as the first instruction execution unit control signal 111, and the second instruction decoder output 82 is selected as the second instruction execution unit control signal 112, ROM address 100, and final step indication signal, to then validate the second instruction decoder 22. At the next instruction decode stage, the first and second instruction decoders 21 and 22 are operated. If the final step indication signal is asserted and the end mode signal indicates the use of both the first and second instruction execution units 51 and 52, the microprogram ROM output 90 is selected as the ROM address 100, first and second instruction execution unit control signals 111 and 112, and final step indication signal, and at the next instruction decode stage the first instruction decoder output 81 is invalidated and the second instruction decoder output 82 is validated, without operating the first and second instruction decoders 21 and 22.

With the processing described above, it becomes possible to control the microprocessor such that the first and second instruction decoder outputs 81 and 82 are selected during the execution of only primitive instructions, the microprogram ROM output 90 is selected when a high performance instruction is decoded, and the first and second instruction decoder outputs 81 and 82 are selected again after completing the process of the high performance instruction. Furthermore, if the first instruction decoder 21 decodes a high performance instruction and the second instruction decoder 22 succeeds its decoding, an instruction decoded by the second instruction decoder 22 can be executed simultaneously with the process of the high performance instruction at the final step.

The second and subsequent step processing at the execution stage, memory access stage, and register store stage is the same as a primitive instruction.

With the system arrangement of the above-described embodiment, it is possible to execute two primitive instructions in parallel by using the single microprogram ROM 30, and to speed up the execution of a high performance instruction by using both the first and second instruction execution units 51 and 52. It is also possible to reduce the area and power consumption of the microprogram ROM 30 and improve the operation speed of the processor.

The present invention is not intended to be limited to the above-embodiments only, but various modifications are possible within the scope of the technical concept of the present invention. For example, a data processor capable of parallel executing three or more primitive instructions can be realized by using three or more instruction decoders and three or more instruction execution units.

According to the present invention, it is possible to execute a plurality of primitive instructions in parallel by using a single microprogram ROM, and to speed up the execution of a high performance instruction by using a plurality of instruction execution units. It is not necessary to use the microprogram ROM 30 when executing a primitive instruction, reducing the capacity of the microprogram ROM 30 for primitive instructions, reducing the area and power consumption of the microprogram ROM 30, and improving the operation speed. Furthermore, only one of the instruction decoder 20 and microprogram ROM 30 operates at any time during the processing, further reducing the power consumption.

What is claimed is:

1. A data processor comprising:

an instruction fetch unit;

first and second instruction decoders each for decoding an instruction supplied from said instruction fetch unit;

a microprogram ROM for storing a microinstruction;

a signal selector to which an output of said first instruction decoder, an output of said second instruction decoder, and an output of said microprogram ROM are input;

a first instruction execution unit controlled by a first output of said signal selector; and a second instruction execution unit controlled by a second output of said signal selector, wherein a primitive instruction is executed by using both of said first and second instruction execution units one time, and when two primitive instructions are decoded by said first and second instruction decoders in parallel, said signal selector selects and outputs said outputs of said first and second instruction decoders to said first and second outputs, respectively, and said first and second instruction execution units execute said two primitive instructions in accordance with said outputs of said first and second instruction decoders transferred to said first and second outputs of said signal selector, and wherein a high performance instruction is executed by using said first instruction execution unit at least two times, and when said high performance instruction is decoded by said first instruction decoder, at a first step processing of said high performance instruction, said signal selector selects and outputs said output of said first instruction decoder to said first output and invalidates the output of said second instruction decoder and said first instruction execution unit executes said first step processing in accordance with said output of said first instruction decoder transferred to said first output of said signal selector, and at a second step processing of said high performance instruction, said signal selector selects and outputs a microinstruction of said output of said microprogram ROM to said first output and said first instruction execution unit executes said second step processing in accordance with said microinstruction of said microprogram ROM transferred to said first output of said signal selector.

2. The data processor according to claim 1, wherein at said second step processing, simultaneously with executing a final step processing of said microinstruction of said microprogram ROM by said first instruction execution unit, said second instruction execution unit performs an instruction execution in accordance with the output of said second instruction decoder.

* * * * *